Figure 5:
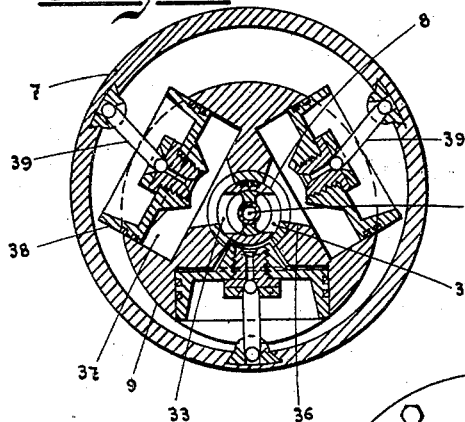

No. 673,956. Patented May 14, 1901.
M. JÖNSSON.
ROTARY STEAM ENGINE.
(Application filed Dec. 29, 1900.)
(No Model.) 4 Sheets—Sheet 1.
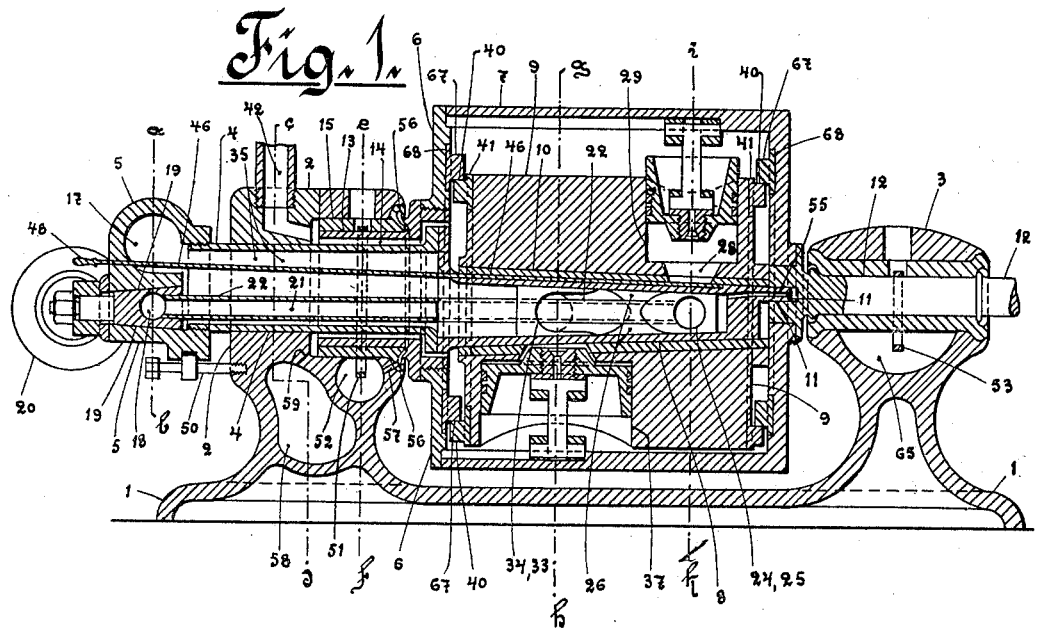
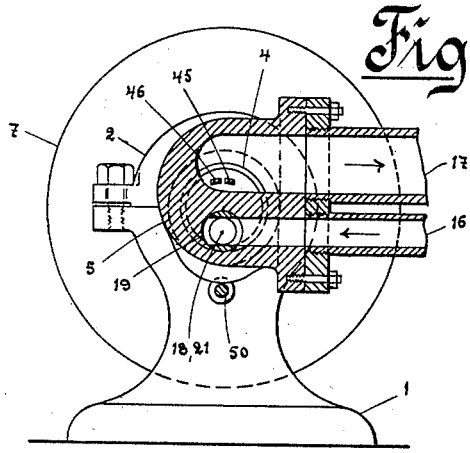
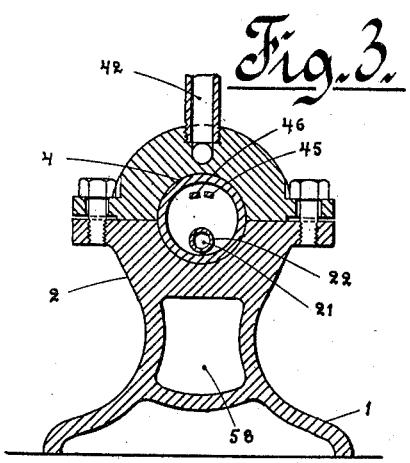
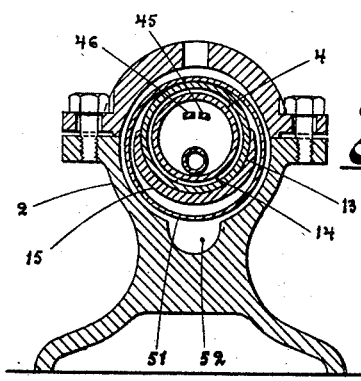
Witnesses.
Signe Wetter.
Evald Lundgren.
Inventor.
Mathias Jönsson No. 673,956. Patented May 14, 1901.
M. JÖNSSON.
ROTARY STEAM ENGINE.
(Application filed Dec. 29, 1900.)
(No Model.) 4 Sheets—Sheet 2.

Witnesses.
Sigurd Wetter
Evald Lundgren

Inventor.
Mathias Jönsson.

THE NORRIS PETERS CO., PHOTO-LITHO., WASHINGTON, D. C.

No. 673,956. Patented May 14, 1901.
M. JÖNSSON.
ROTARY STEAM ENGINE.
(Application filed Dec. 29, 1900.)
(No Model.) 4 Sheets—Sheet 3.
Fig. 11.
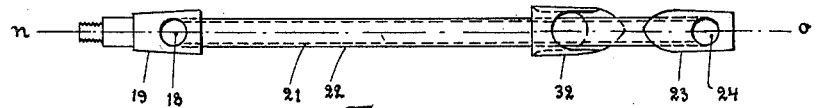
Fig. 12.
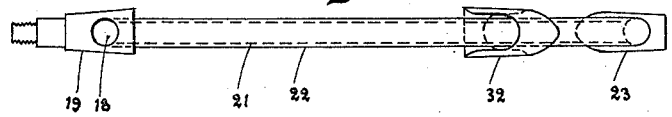
Fig. 13.
Fig. 14.
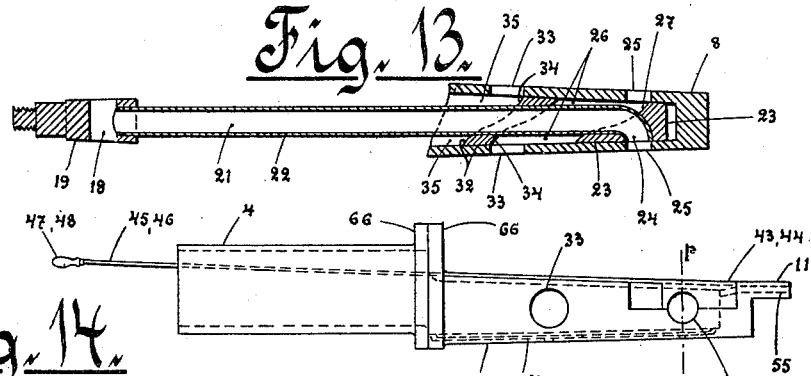
Fig. 15.
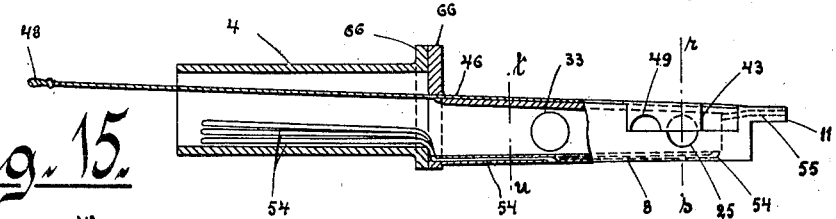
Fig. 16. Fig. 17.
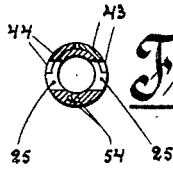 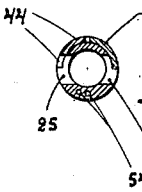
Fig. 18.
Witnesses.
Signe Wetter
Evald Lundgren.
Inventor.
Mathias Jönsson No. 673,956. Patented May 14, 1901.
M. JÖNSSON.
ROTARY STEAM ENGINE.
(Application filed Dec. 29, 1900.)
(No Model.) 4 Sheets—Sheet 4.
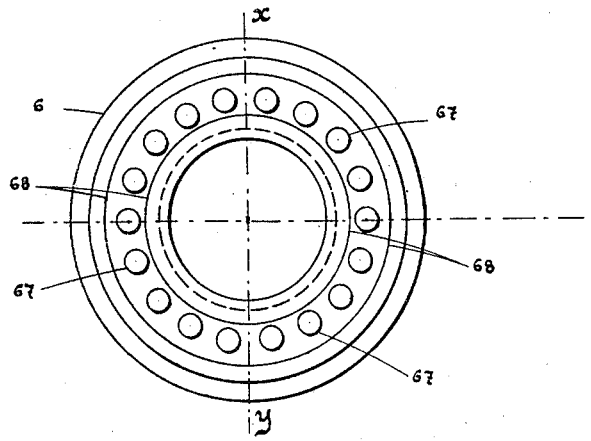
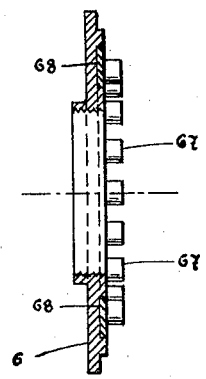
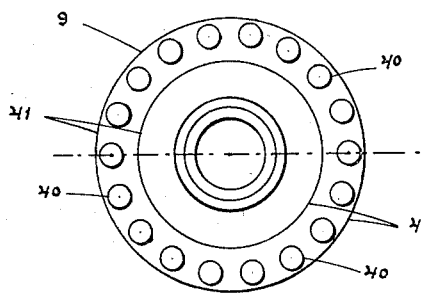
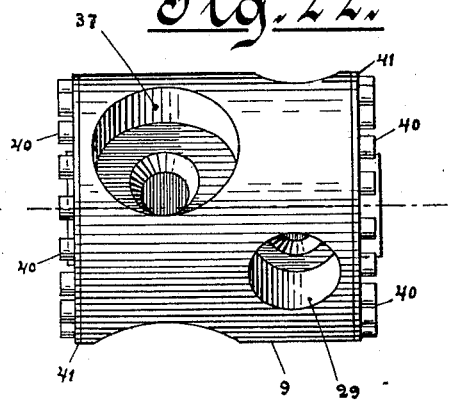
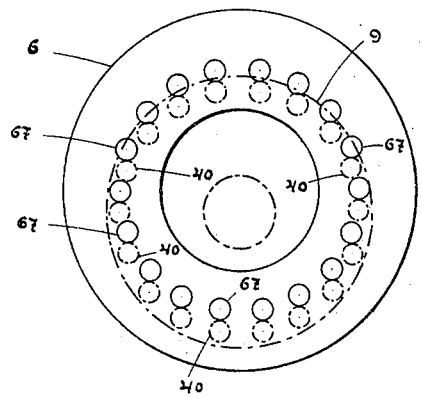

UNITED STATES PATENT OFFICE.

MATHIAS JÖNSSON, OF WISBY, SWEDEN.

ROTARY STEAM-ENGINE.

SPECIFICATION forming part of Letters Patent No. 673,956, dated May 14, 1901.

Application filed December 29, 1900. Serial No. 41,510. (No model.)

*To all whom it may concern:*

Be it known that I, MATHIAS JÖNSSON, a subject of the King of Sweden and Norway, residing at Wisby, in the Kingdom of Sweden, have invented certain new and useful Improvements in Rotary Steam-Engines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention relates to a rotary steam-engine of the kind consisting of a rotatably-journaled driving-wheel or driving-drum in jointed connection with a cylindrical part or center piece eccentrically mounted inside the former and rotatably journaled around a tubular valve in which are apertures for admitting steam into and discharging it from radial steam-cylinders located in the cylindrical center piece and provided with pistons the connecting-rods of which are jointed both to said pistons and to the driving-wheel.

The present invention is characterized by several systems of cylinders in the same center piece—one for high-pressure steam and the others successively for low-pressure steam—and in which the steam acts according to well-known principles. The rate of expansion of the steam in the cylinders can be readily varied, and the direction of rotation can likewise readily be reversed, the engine consequently being specially adapted for the propulsion of boats or vessels. All the operating parts of the engine are well lubricated, the friction being consequently reduced to a minimum and a smooth and silent running being procured.

The invention is illustrated in the accompanying drawings.

Figure 6:
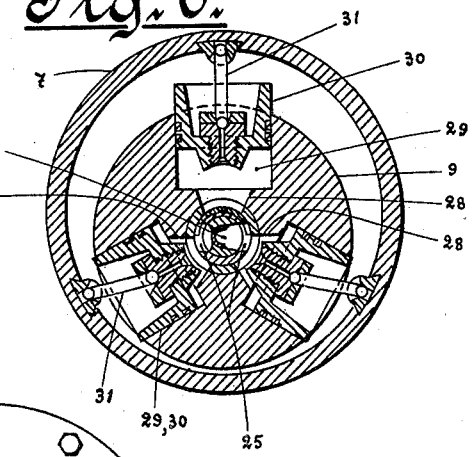
Figure 7:
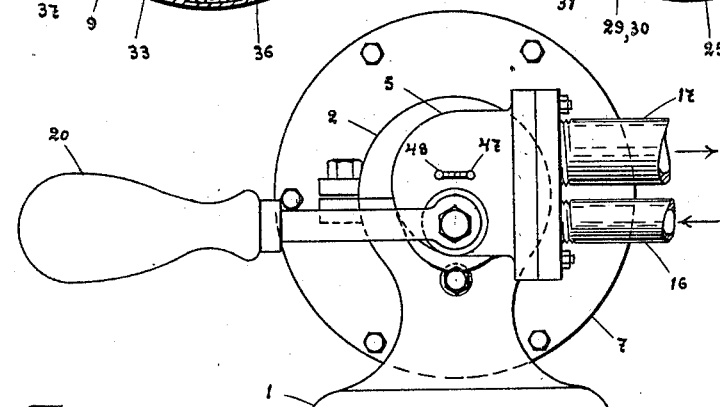
Figure 8:
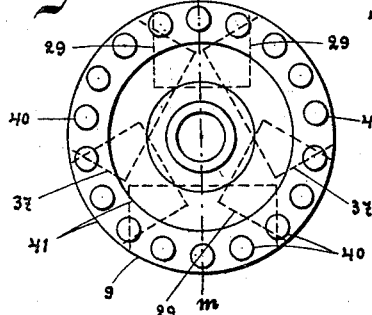
Figure 9:
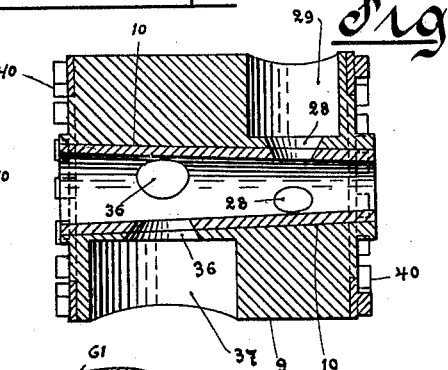
Figure 10:
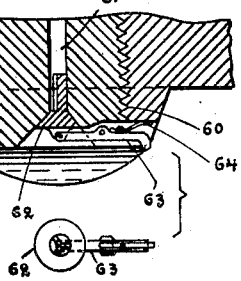

Figure 1 shows the engine in a vertical section. Fig. 2 shows the engine in a section on line $a\,b$ of Fig. 1 viewed from the left. Figs. 3 and 4 are sections on line $c\,d$ and $e\,f$ of Fig. 1, respectively, viewed from the left, the driving-wheel removed. Figs. 5 and 6 are two sections of the driving-wheel 7 on lines $g\,h$ and $i\,k$ of Fig. 1, respectively, viewed, respectively, from the right and the left of said figure. Fig. 7 shows an end view of the engine. Fig. 8 shows the cylindrical center piece 9 viewed from the right of Fig. 1. Fig. 9 shows the same piece in section on line $l\,m$ of Fig. 8 viewed from the left. In the two latter figures the pistons are removed from the steam-cylinders. Fig. 10 shows a portion of a piston 30 38 on a larger scale and in a central section, together with a horizontal projection of a lubricating-valve 62, located in the piston. Figs. 11 to 13 show the tube or pipe 22, in which is situated the steam-admission passage of the high-pressure cylinders, said tube being in Figs. 11 and 12 viewed from two opposite sides and in Fig. 13 in a longitudinal section on line $n\,o$ of Fig. 11 viewed from above. In the latter view, Fig. 13, is also shown a portion of the surrounding plug-valve 8. Figs. 14 and 15 show the tube or pipe 4 and the plug-valve 8, around which the cylindrical center piece is journaled, viewed as in Fig. 11, in Fig. 14 not in section, and in Fig. 15 partially in a longitudinal section. Figs. 16 to 18 are cross-sections of the plug-valve respectively on lines $p\,q$ of Fig. 14 and $r\,s$ and $t\,u$ of Fig. 15, all these sections being viewed from the left in their respective figures. Figs. 19 to 23 illustrate the connection of the driving-wheel 7 to the center piece 9. Fig. 19 shows the driving-wheel cover 6 viewed from the left of Fig. 1. Fig. 20 shows the same cover in section on line $x\,y$ of Fig. 19 viewed from the left. Fig. 21 shows the cylindrical center 9 from the left of Fig. 1; and Fig. 22 the same viewed from the right of Fig. 21—*i. e.*, viewed as in Fig. 1. Fig. 23 will be explained below.

The frame 1, Fig. 1, is provided with two pedestals 2 3. Through one pedestal 2 is carried a pipe 4 and secured there. The outward-pointing end of this pipe 4 is screwed into a valve-chamber 5. The other end of the same pipe 4 passes through the cover 6 of the driving-wheel 7 and is provided with a tubular plug-valve 8, eccentric to the pipe 4. The pipe 4 and plug-valve 8 are provided with flanges 66, Figs. 1, 14, and 15, bearing on each other and held together by screws or the like, so that they can be readily disengaged. Around the plug-valve 8, Fig. 1, is journaled the cylindrical center piece 9, in which is inserted a metal bushing 10, Figs. 1 and 9, closely surrounding the plug-valve 8. The latter is provided at one end with a pin 11, Figs. 1, 14, and 15, entering rotatably in a corresponding recess bored out of the center of the driving-wheel shaft 12, which is journaled in the pedestal 3, Fig. 1. On the cover 6, Fig. 1, of the driving-wheel 7 is removably screwed a tubular hub 13, concentrically surrounding the pipe 4, having an intermediate space 14 between them, said hub being journaled in the pedestal 2. The hub 13 is adjoined by a surrounding metal bushing 15, inserted into the pedestal 2. The steam-admission pipe 16 and discharge-pipe 17, Figs. 2 and 7, communicate with the valve-chamber 5. The pipe 17 communicates with the interior of the pipe 4, Fig. 1—i. e., the space 35. The admission-pipe 16 either communicates with or is shut off from a transverse passage 18 in a plug-valve 19, rotatably inserted in the valve-chamber 5, Figs. 1 and 2, according to the position of said plug. The plug-valve 19 is provided outside the valve-chamber with a handle 20, Figs. 1 and 7. The transverse passage 18, Fig. 1, of the plug 19 communicates with the admission-passage 21 of the smaller pipe 22, which is rotatably inserted lengthwise through the pipe 4 and plug-valve 8. The inner end of pipe 22 has an enlarged portion 23, Figs. 1, 11, 12, and 13, fitting steam-tight and rotatably in the surrounding plug-valve 8. In this enlarged portion the admission-pipe 21 terminates on one side in the aperture 24. If the handle 20 is situated as shown in Figs. 1 and 7, the aperture 24 is opposite one of two diametrally-placed holes 25 in the plug-valve 8, Figs. 1 and 6. The other hole 25 then communicates with a receiver 26, owing to the recess 27, milled out of the enlarged portion 23, Figs. 1, 11, 12, and 13. On the other side these holes 25, Figs. 1 and 6, according to the position of the cylindrical center piece 9, either are shut off from or communicate with the steam-ports 28 of the three high-pressure cylinders 29, which are located radially in the center piece 9. The cylinders 29 are provided in the usual manner with pistons 30 and connecting-rods 31, which latter are jointed to the driving-wheel 7 and pistons 30. The receiver 26, Figs. 1, 11, 12, and 13, is situated between the pipe 22 and the wall of the surrounding plug-valve 8 and is bounded at one end by the enlarged portion 23, above mentioned, and at the other end by another enlarged portion 32, which likewise fits steam-tight in the plug 8 and can revolve in it. Opposite the latter enlargement 32 two holes 33 are made diametrally in the plug 8, said holes by means of lateral recesses 34, milled out of the enlargement 32, being made on one side to communicate one of them with the receiver 26 and the other with the chamber 35 in the plug 8 and the pipe 4, Fig. 1. This chamber, as before mentioned, communicates with the steam-exhaust pipe 17. On the other side the holes 33, Figs. 1 and 5, according to the position of the driving-wheel 7, are either shut off from or communicate with the steam-ports 36 of the three low-pressure cylinders 37. In the latter there are in the same manner as in the high-pressure cylinders 29 located pistons 38, with connecting-rods 39.

The cylindrical piece 9 is jointed to the driving-wheel 7 by means of a number of pins 40, Figs. 1, 8, and 19 to 23, located at the end faces of the said cylindrical center piece along their circumference. The pins 40 are alternatively surrounded by rollers and mounted on rings 41, which are removably secured to the center piece. The pitch or distance apart of the pins is equal to the diameter of one pin, being, moreover, so gaged that such a pin can readily pass through the space between two others. The pins 40 at the two end faces of the center piece 9 are so located in relation to each other that opposite each pin of one of the end faces is a space on the other end face. On the cover 6 of the driving-wheel 7 and on the end wall opposite are likewise located corresponding pins 67, bearing with their cylindrical surfaces against those of the first-mentioned pins. Like the others, the pins 67 are mounted on removable rings 68.

Fig. 23 is a diagram view showing the position of the pins 40 67 on the left side of the center piece 9 and driving-wheel 7, Fig. 1. In Fig. 23, 9 merely denotes the outline of the center piece.

The interior space of the driving-wheel 7 communicates through the intermediate space 14 with an exhaust-passage 42 for the waste steam.

On the outside of the plug-valve 8 are sunk into the latter two expansion-valves 43 44, Figs. 1 and 14 to 18, one for each of the holes 25, communicating with the high-pressure cylinders 29. The valves 43 44 are shaped after the plug 8, so that the surface of the latter is smooth, and are adapted to be shifted longitudinally in their recesses. For this purpose rods 45 46 are respectively secured to the valves 43 44, one for each valve, said rods likewise being wholly sunk into the plug 8. The rods 45 46 are located side by side and continued through the pipe 4 and the wall of the valve-chamber 5. Outside the valve-chamber they are provided with handles 47 48, respectively, Figs. 1 and 7. In the valves 43 44 are made semicircular recesses 49, Figs. 14 and 15, one in each valve. When the said valves or slides are pushed into their extreme inner position, Figs. 14 and 16, the recesses 49 will be opposite the holes 25, the latter consequently being uncovered. When the valves or slides are fully withdrawn, Figs. 15 and 17, they will cover about one-half of the holes 25.

By means of the adjusting-screw 50, Fig. 1, the valve-chamber 5 can be shifted forward or backward or so that the plug 8 will be properly adjusted in the center piece 9.

The hub 13, Fig. 1, and the shaft 12 of the driving-wheel are provided with an ordinary ring lubricator consisting of a wide ring 51, surrounding the hub 13, so as to bear upon it at its upper side, while its under side dips into an oil-cellar 52 in the pedestal 2. At the shaft 12 of the driving-wheel, 53 is the ring and 65 the oil-cellar.

In the wall of the pipe 4 are made a number of oiling-grooves 54, Fig. 15, continued in the wall of the plug 8. Some of these oil-grooves 54 terminate opposite the holes 25. One of said grooves continues in the direction of one end of the plug 8, terminating inward in the latter, so as to communicate with a lubricating-passage 55, arranged in the pin 11, Figs. 1, 14, and 15.

In the pin 60, Fig. 10, by means of which the bearing or box of each connecting-rod is secured to the piston 30 and 38, respectively, is located a lubricating-passage 61, commencing at the side of the piston facing the plug 8 and continuing to the end of the connecting-rod 31 and 39, respectively, Figs. 1, 5, and 6. In the passage 61, Fig. 10, is inserted a valve 62, jointed to a lever 63, fulcrumed at the middle and actuated by a spring 64, striving to keep the valve closed.

The hub 13, Fig. 1, is provided with a ridge 56, entering in a recess in the bushing 15 and preventing the oil from spattering out. The said recess communicates with the oil-cellar through a passage 57. The intermediate space 14 communicates with the oil-cellar 58 in the pedestal 2 through a passage 59.

The steam-engine operates and is operated in the following manner: When the position of the handle 20 is that shown in Figs. 1 and 7, steam is admitted from the supply-pipe 16 to the passage 18, Fig. 2, and continues its course through the passage 21, Fig. 1. Admission of steam to the high-pressure cylinders 29 now follows through the aperture 24 and the hole 25 opposite, Figs. 1, 6, and 13, the center piece 9 and driving-wheel 7 being consequently set in rotation in known manner. The pins 40 and 67 consequently will rotate in pairs around each other. When the driving-wheel 7 and center piece 9 have completed one revolution, the pins 40 will evidently have completed one turn about each other. Owing to the fact that the pins 40 each side of the center piece 9 are not opposite each other, the driving-wheel and center piece will be guided in a perfect manner during their rotation. The discharge of the steam from the high-pressure cylinders 29 takes place through the other hole 25, past the recess 27, the steam subsequently flowing into the receiver 26. Steam admission from the receiver 26 to the low-pressure cylinders 37 takes place through one of the holes 33, which communicates with the receiver. The steam now has a lower pressure and is further caused to expand in the low-pressure cylinders 37. From the latter the steam escapes through the other hole 33 and finally exhausts from the engine through the space 35 and discharge-pipe 17, or it may enter the next receiver, where several systems of low-pressure cylinders are used. When the handle 20 is diametrally reversed, the aperture 24 of the passage 21 is brought into communication with the hole 25 diametrally opposite, so that the steam admission to the high-pressure cylinders 29 takes place through the latter, and the direction of rotation consequently is reversed. The steam admission and exhaust likewise become exchanged for the low-pressure cylinders 37 at the holes 33. When the handle 20 is rotated through ninety degrees or so as to point straight downward, the steam will be shut off from the admission-pipe 16, and the engine is thus brought to a standstill. If the valve 43, Fig. 15, is pulled out so as to be opposite the hole 25, through which the steam entered in the first place, the steam will be shut off earlier from the passing cylinders 29, a greater rate of expansion being thereby the result. The latter expansion device may be used with the engines whether they be provided with low-pressure cylinders or not. By means of the pin 11 the plug 8 obtains a steady support during the working of the engine. Through the lubricating-passages 54, Fig. 15, oil is forced in to lubricate the plug 8. One of said passages 54 supplies oil to the passage 55 in the pin 11, thus lubricating the latter. When in the course of their rotation the pistons 30 38 arrrive close to the cylinder-bottom, the valve 62 opens, letting in oil to the connecting-rods from the passages 54. The pistons themselves are also supplied with oil from the passages 54. In the oil-cellar 58 all consumed oil collects which accompanies the waste steam from the driving wheel or drum, as well as the consumed oil from the hub 13.

Having described my invention, what I claim is—

1. A rotary steam-engine provided with a rotatably-journaled driving-wheel or driving-drum 7 in jointed connection with a cylindrical center piece 9 eccentrically located within said driving-wheel and rotatably journaled around a tubular plug-valve 8 in which are two diametrally-situated holes 25 for admitting steam into and discharging it from radial steam-cylinders 29 arranged in the aforesaid center piece 9 and provided with pistons 30 and connecting-rods 31, in combination with one or more systems of low-pressure cylinders 37 arranged in the same center piece 9 as the former cylinders 29, the high-pressure cylinders, and similarly to them and having diametral admission and discharge apertures 33 in the tubular plug-valve 8, for the purpose described.

2. A rotary steam-engine provided with a rotatably-journaled driving-wheel or driving-drum 7 in jointed connection with a cylindrical center piece 9 eccentrically located within said driving-wheel and rotatably journaled around a tubular plug-valve 8, in combination with a pipe 4 arranged in such a manner that the pipe 4 and plug-valve 8 bear against each other by means of flanges 66 held together removably by screws or like means, the plug 8 and pipe being eccentrically situated in relation to each other, for the purpose described.

3. A rotary engine provided with a rotatably-journaled driving-wheel or driving-drum 7 in jointed connection with a cylindrical center piece 9 eccentrically located within said driving-wheel and rotatably journaled around a tubular plug-valve 8 which is eccentrically secured to a pipe 4 screwed into a valve-chamber 5 and in which plug 8 are located diametral holes for the admission of steam into and discharging it from radial high-pressure cylinders 29 in the cylindrical center piece 9, in combination with a smaller pipe 22 rotatably inserted in the pipe 4 and the tubular plug 8 and provided at its outer end with a plug-valve or plug 19 entering in the valve-chamber 5 and provided outside the latter with a handle 20, the transverse passage 18 of said plug 19 being adapted to communicate on one side with, or to be shut off from, the steam-admission pipe 16 of the engine and on the other side to communicate with a steam-admission passage 21 inclosed by the rotatable pipe 22 the inner end of which is provided with an enlarged portion 23 fitting closely in the surrounding plug 8 and provided with an aperture 24 by means of which the admission-passage 21 is made to communicate with either of the holes 25 in the surrounding plug 8 when the rotatable pipe is in a certain definite position, for the purpose described.

4. A rotary engine provided with a rotatably-journaled driving-wheel or driving-drum 7 in jointed connection with a cylindrical center piece 9 eccentrically located within said driving-wheel and rotatably journaled around a tubular plug-valve 8 which is eccentrically secured to a pipe 4 screwed into a valve-chamber 5 and in which plug 8 are located diametral holes for the admission of steam into and discharging it from radial high-pressure cylinders 29 and low-pressure cylinders 37 in the cylindrical center piece 9, in combination with a smaller pipe 22 rotatably inserted in the pipe 4 and the tubular plug 8 and provided at its outer end with a plug-valve or plug 19 entering in the valve-chamber 5 and provided outside the latter with a handle 20, the transverse passage 18 of said plug 19 being adapted to communicate on one side with, or to be shut off from, the steam-admission pipe 16 of the engine and on the other side to communicate with a steam-admission passage 21 inclosed by the rotatable pipe 22 the inner end of which is provided with an enlarged portion 23 fitting closely in the surrounding plug 8 and provided with an aperture 24 by means of which the admission-passage 21 is made to communicate with either of the holes 25 in the surrounding plug 8 when the rotatable pipe is in a certain definite position, for the purpose described.

5. A rotary engine provided with a rotatably-journaled driving-wheel or driving-drum 7 in jointed connection with a cylindrical center piece 9 eccentrically located within said driving-wheel and rotatably journaled around a tubular plug-valve 8 which is eccentrically secured to a pipe 4 screwed into a valve-chamber 5 and in which plug 8 are located diametral holes for the admission of steam into and discharging it from radial high-pressure cylinders 29 and low-pressure cylinders 37 in the cylindrical center piece 9, there being rotatably inserted through the pipe 4 and the tubular plug 8 a smaller pipe 22 with a steam-admission passage 21 and said rotatable pipe 22 having at its inner end an enlarged portion 23 fitting closely in the surrounding tubular plug 8 and containing an aperture 24 adapted to place the admission-passage 21 in communication with either of the diametral holes 25 of the plug 8 when the rotatable pipe 22 is given a certain predetermined position, in combination with a receiver 26 consisting of the space or chamber situated in the tubular plug 8 outside of the rotatable pipe 22, said receiver being bounded at one end by the enlarged portion 23 mentioned above and at its other end by another enlargement 32 on the rotatable pipe 22 and communicating on one side with those two of the diametral holes 25 and 33 of the plug 8 of which one 25 forms outlet from the high-pressure cylinders 29 while the other 33 forms inlet to the low-pressure cylinders 37, the hole 33 forming outlet from the latter cylinders 37 communicating with the steam-discharge passage 35 of the engine or alternatively with another receiver arranged similarly to the former, in case several systems of low-pressure cylinders are used, for the purpose described.

6. A rotary engine provided with a rotatably-journaled driving-wheel or driving-drum 7 in jointed connection with a cylindrical center piece 9 eccentrically located within said driving-wheel and rotatably journaled around a tubular plug-valve 8 which is eccentrically secured to a pipe 4 screwed into a valve-chamber 5 and in which plug 8 are located diametral holes for the admission of steam into and discharging it from radial high-pressure cylinders 29 in the cylindrical center piece 9; in combination with two expansion-valves 43, 44 sunk into the tubular plug 8 flush with its outside surface at each of the diametral holes 25 leading to the high-pressure cylinders 29, said valves 43, 44 being arranged to be shifted longitudinally in relation to the plug 8 by means of rods 45, 46 attached to them and likewise sunk into the plug 8, flush with it, and continuing through the pipe 4 on which the plug 8 is mounted and out through the valve-chamber 5 on the outside of which they are provided with handles 47, 48, and the valves 43, 44 moreover being provided with semicircular recesses 49 arranged so as to leave the hole 25 fully open when the valve is pushed clear in, while said hole becomes half closed when the valve is fully withdrawn, for the purpose specified.

7. A rotary engine provided with a rotatably-journaled driving-wheel or driving-drum 7 in jointed connection with a cylindrical center piece 9 eccentrically located within said driving-wheel and rotatably journaled around a tubular plug-valve 8 which is eccentrically secured to a pipe 4 screwed into a valve-chamber 5 and in which plug 8 are located diametral holes for the admission of steam into and discharging it from radial high-pressure cylinders 29 and low-pressure cylinders 37 in the cylindrical center piece 9; in combination with two expansion-valves 43, 44 sunk into the tubular plug 8 flush with its outside surface at each of the diametral holes 25 leading to the high-pressure cylinders 29 said valves 43, 44 being arranged to be shifted longitudinally in relation to the plug 8 by means of rods 45, 46 attached to them and likewise sunk into the plug 8, flush with it, and continuing through the pipe 4 on which the plug 8 is mounted and out through the valve-chamber 5 on the outside of which they are provided with handles 47, 48, and the valves 43, 44 moreover being provided with semicircular recesses 49 arranged so as to leave the hole 25 fully open when the valve is pushed clear in, while said hole becomes half closed when the valve is fully withdrawn, for the purpose specified.

8. A rotary steam-engine provided with a rotatably-journaled driving-wheel or driving-drum 7 in jointed connection with a cylindrical center piece 9 eccentrically located within said driving-wheel; in combination with pins 40 which may or may not be surrounded by rollers and which pins are located along the periphery at the two sides of the cylindrical center piece 9 on rings 41 removably secured to the center piece 9, the pitch or distance apart of said pins 40 being equal to the diameter of the pin, and other corresponding pins 67 similarly arranged in the driving-wheel or driving-drum 7, for the purpose specified.

9. A rotary steam-engine provided with a rotatably-journaled driving-wheel or driving-drum 7 in jointed connection with a cylindrical center piece 9 eccentrically located within said driving-wheel and rotatably journaled around a tubular plug-valve 8 which is attached to a pipe 4 carried through a pedestal 2 on the engine-frame; in combination with a tubular hub 13 screwed into the driving-wheel 7 and concentrically surrounding the pipe 4 so as to leave an intermediate space 14 between through which the interior of the driving-wheel communicates partly with a passage 42 for waste steam and partly with an oil-cellar 58 for consumed oil, the said communication being brought about by means of a smaller passage 59 between the oil-cellar 58 and the intermediate space 14, for the purpose specified.

10. A rotary steam-engine provided with a rotatably-journaled driving-wheel or driving-drum 7 in jointed connection with a cylindrical center piece 9 eccentrically located within said driving-wheel and rotatably journaled around a tubular plug-valve 8; in combination with a pin 11 on the end of the plug 8, which pin rotatably enters in a correspondingly-bored hole in the center of the driving-wheel shaft 12 and has a lubricating-passage passing through it, for the purpose specified.

11. A rotary steam-engine provided with a rotatably-journaled driving-wheel or driving-drum 7 in jointed connection with a cylindrical center piece 9 eccentrically located within said driving-wheel and rotatably journaled around a tubular plug-valve 8 provided with a pin 11 having a lubricating-passage 55 through it and entering rotatably in the center of the driving-wheel shaft 12, and which tubular plug 8 is eccentrically secured to a pipe 4 and provided with diametral admission and exhaust passages 25 and 33 for steam-cylinders 29, 37 arranged radially in the center piece 9 and provided with pistons 30, 38 and connecting-rods 31, 39 in combination with lubricating-passages 54, 61 arranged partly in the pipe 4 with its eccentrically-secured plug 8 and partly in the center of each cylinder-piston 30, 38, of which passages those 54 located in the pipe 4 and plug 8 terminate opposite the diametral holes 25, 33 of the latter, leading to the steam-cylinders 29, 37, one of said passages 54 moreover continuing toward the end of the plug 8 and there terminating inward in the latter and communicating with the lubricating-passage 55 in the pin 11 of the plug, while in each of the passages 61 at the center of the pistons is located a valve 62 jointed to a lever 63 fulcrumed at the middle and actuated by a spring 64 causing the valve to open when the piston comes close to the bottom of the cylinder, for the purpose specified.

In testimony that I claim the foregoing as my invention I have signed my name in presence of two subscribing witnesses.

MATHIAS JÖNSSON.

Witnesses:
 SIGNE WETTER,
 EVALD LUNDGREN.